Aug. 28, 1928.
H. E. FISHER
SIGNAL DEVICE
Filed Oct. 22, 1927
1,682,073
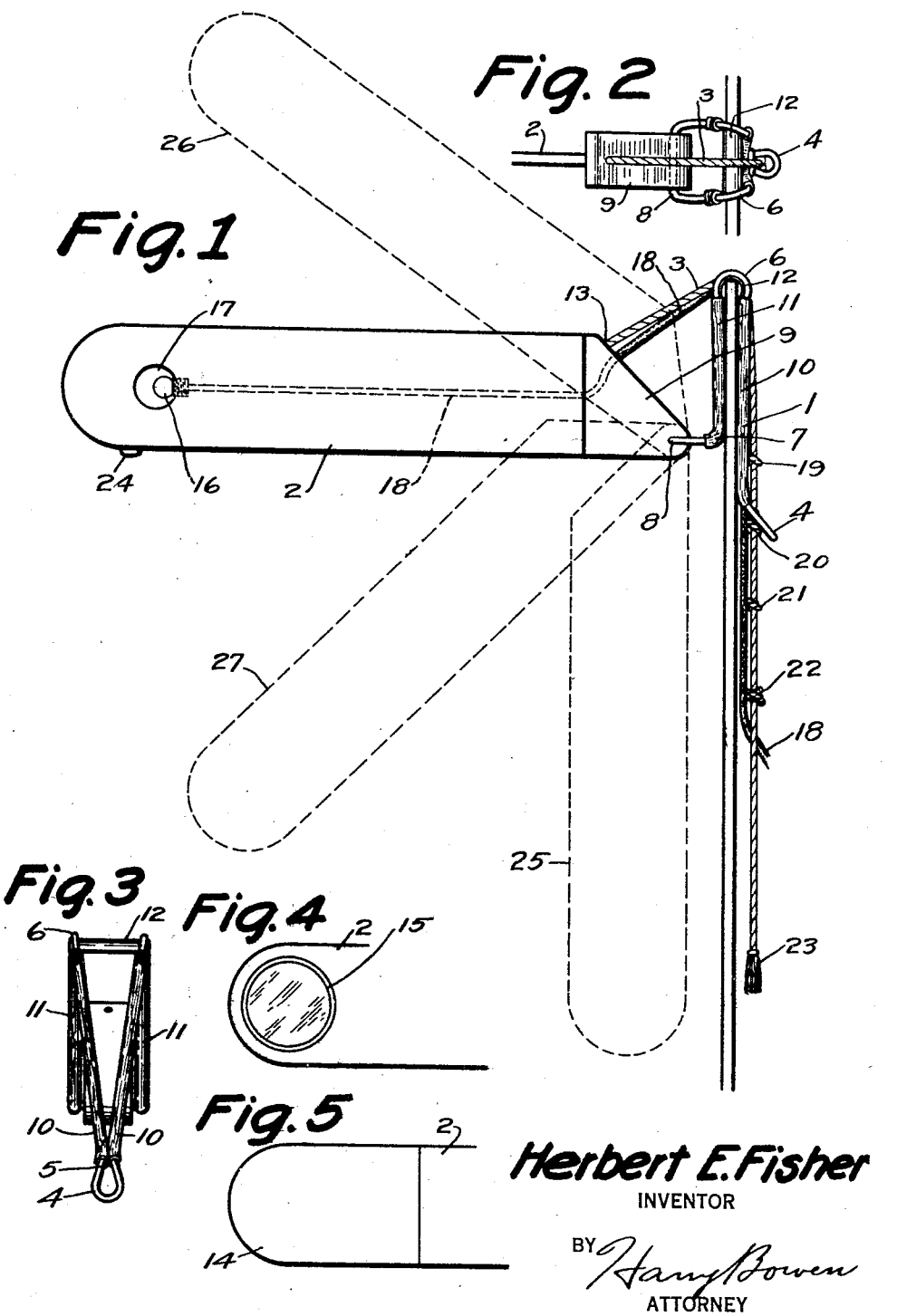
Herbert E. Fisher
INVENTOR
BY Harry Bowen
ATTORNEY Patented Aug. 28, 1928.

1,682,073

UNITED STATES PATENT OFFICE.

HERBERT E. FISHER, OF SEATTLE, WASHINGTON.

SIGNAL DEVICE.

Application filed October 22, 1927. Serial No. 227,918.

The invention is a motor vehicle signal which may readily be placed on the upper edge of the window glass and operated by hand and which may readily be removed as desired.

The object of the invention is to provide a signal device which is particularly adaptable for motor vehicles of the enclosed type which is manually operated and readily removable.

Another object of the invention is to provide a signal for motor vehicles of the enclosed type which is adaptable to be placed on the upper edge of the glass of a door or window.

Another object of the invention is to provide a signal device having an arm adaptable to be pivotally attached to the side of a motor vehicle and operated by a cord.

A further object of the invention is to provide means for pivotally mounting and removably attaching an arm to the upper edge of the glass of a door or window of a motor vehicle of the enclosed type.

A still further object of the invention is to provide a bracket adaptable to pivotally support an arm on the upper edge of a pane of glass in which the bracket is provided with means for holding a cord attached to the arm to hold the arm in different positions.

And a still further object of the invention is to provide a signal device comprising an arm pivotally and removably attached to the upper edge of a pane of glass which is of a simple and economical construction.

With these ends in view the invention embodies a bracket adaptable to be supported on the upper edge of a pane of glass or the like, and an arm pivotally attached to the arm and passing through the bracket for readily operating and holding the arm.

Other features and advantages of the invention will appear from the following description taken in connection with the drawings, wherein:—

Figure 1 is a side elevation of the device as it would appear mounted on the upper edge of a pane of glass.

Figure 2 is a plan view of the device with part of the arm broken away.

Figure 3 is a view looking toward the inner side of the bracket.

Figure 4 is a view showing the tip of the arm with a reflector used instead of a light.

Figure 5 is a similar view showing a plain tip at the end of the arm.

In the drawings the device is shown as it would be made wherein numeral 1 indicates the bracket, numeral 2 the arm and numeral 3 the cord.

In the design shown the bracket 1 is formed with a heavy wire or rod with a loop 4 at the lower end from which the sides converge as shown at the point 5 in Figure 3 so that the cord may be wedged between them. The sides then extend upward and are bent over as shown at the point 6 in Figure 1 and then downward to the point 7 from where they are bent outward to the point 8 where they bend toward each other and extend into a circular opening in the base 9 of the arm 2. The members of the bracket may be covered by rubber sleeves 10 and 11 as shown to protect the glass upon which the bracket may be placed, however it is understood that these sleeves may be made of leather or any other suitable material or a flat strip of leather or any other suitable material may be placed between the bracket and glass and may extend upward over the upper edge of the glass if desired. A curved plate 12 may be placed on the inner side of the loop 6 at the upper end of the bracket which will rest on the upper edge of the glass and upon which the cord 3 will rest. It will be observed that as the cord is pulled downward to raise the arm it will slide over the plate 12 and as the ends of the plate are attached to the members of the bracket it will hold the bracket downward as the arm is being raised.

The arm 2 may be made of a flat piece of material which is pivotally held in the bracket through a base 9 as shown and which is adjustably held by the cord 3 which is attached to the base at the point 13. The arm may be plain as shown in Figure 5 with the tip as indicated by the numeral 14 covered with white or luminous paint so that it may readily be seen in the dark. This tip may also be provided with a reflector 15 as shown in Figure 4 which may reflect the rays of light from the lamps of an approaching vehicle, backward so that the signal may readily be observed from the approaching vehicle. The tip may also be provided with an electric lamp as indicated by the numeral 16 and installed in an opening 17 so that the end of the arm may be equipped with a light if desired. The light may readily be observed from both sides of the arm and it is also understood that the reflector 15 may be provided on both sides or may be installed within the arm so that it may readily be observed from either side. The light 16 may be connected by an electric cord 18 which may extend over the upper end of the bracket and downward to the interior of the vehicle. This cord may however be arranged in any suitable manner.

The cord 3 may be made of fabric, flexible wire or any suitable material and may be provided with a plurality of knots 19, 20, 21 and 22, as shown in Figure 1 which may be caught on the under side of the lower end of the bracket to hold it in different positions. These knots with the exception of knot 22 may pass through the opening in the loop 4 of the bracket. Although these obstructions are referred to as knots it is understood that beads or any other suitable means may be used on the cord to hold it in the loop of the bracket or they may be omitted and the cord wedged between the members of the loop 4 as they converge to the point 5, which will hold the cord in any suitable position. The lower end of the cord may be provided with a tassel as indicated by the numeral 23 or may extend to any suitable location. The lower edge of the arm 2 may be provided with a resilient button as indicated by the numeral 24 which may rest against the glass, should the button 22 fail to hold the arm in the position indicated by the dotted lines 25. It will be observed that the button 20 will hold the arm to the position shown in full lines to indicate that the vehicle is about to turn to the left, or the button 19 will hold the arm in the position indicated by the dotted lines 26 to indicate that the vehicle is about to turn to the right, and the knot 21 will hold the arm in a position indicated by the dotted lines 27 to show that the vehicle is about to slow up or stop.

It will be understood that changes may be made in the construction without departing from the spirit of the invention. One of which changes may be in the shape or design of the arm, another may be in the use of other means for pivotaly supporting the arm and still another may be in the use of other means for operating the arm.

The construction will be readily understood from the foregoing description. To use the device it may be supplied assembled as shown in Figure 1 so that it may readily be placed over the upper edge of the glass of the window or door with the free end of the cord hanging through the loop 4 and it will be observed that as it is desired to use the device, the cord may be pulled downward until the arm is at the proper position and then caught in the loop 4 so that it may be held in that position. The position of the arm may be readily adjusted by pulling the inner end of the cord downward or permitting it to raise and the arm may readily be held in any suitable position by clamping the cord in the small end of a loop or providing other means on the cord for holding it.

Having thus fully described the invention, what I claim as new and desire to secure by Letters Patent, is:

1. In a device of the class described, an arm comprising a comparatively thin flat piece of material with a hub at one end, a bracket for supporting the arm comprising a saddle and a wire, said wire bent in the form of an inverted U with means at the lower end of one leg for pivotally supporting the arm through the hub and a loop with converging sides at the lower end of the other leg, and a cord attached to the arm through the hub, passing over a saddle at the upper end of the bracket and through the loop at the lower end of the bracket the converging sides of the said loop being adaptable to hold the cord at different points to hold the arm in different positions.

2. In a signal device of the class described a comparatively flat arm with means for rendering it visible at the outer end, and an enlarged portion at the inner end, an inverted U shaped bracket having means at one end for pivotally supporting the arm and a loop with converging sides at the other end, a cord attached to the arm and passing over a saddle at the top of the bracket and then downward through the loop at the opposite end of the bracket and means whereby the said cord may be held between the converging sides of the said loop.

HERBERT E. FISHER.